(12) United States Patent
Bastide et al.

(10) Patent No.: US 12,229,725 B2
(45) Date of Patent: Feb. 18, 2025

(54) SYSTEM FOR SOCIAL VERSIONING

(71) Applicant: International Business Machines Corporation, Armonk, NY (US)

(72) Inventors: Paul R. Bastide, Boxford, MA (US); Lin Sun, Cary, NC (US); Liam S. Harpur, Dublin (IE); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 16/006,311

(22) Filed: Jun. 12, 2018

(65) Prior Publication Data

US 2019/0378090 A1  Dec. 12, 2019

(51) Int. Cl.
*G06Q 10/10* (2023.01)
*G06F 16/93* (2019.01)

(52) U.S. Cl.
CPC .......... *G06Q 10/103* (2013.01); *G06F 16/93* (2019.01)

(58) Field of Classification Search
CPC .. G06Q 10/103; G06Q 10/0633; G06Q 10/00; G06Q 10/06
See application file for complete search history.

(56) References Cited

U.S. PATENT DOCUMENTS

| | | | |
|---|---|---|---|
| 7,302,674 B1 * | 11/2007 | Gladieux | G06Q 10/06 707/999.107 |
| 9,774,561 B1 | 9/2017 | Rapp et al. | |
| 10,387,559 B1 * | 8/2019 | Wendt | G06F 16/93 |
| 10,747,994 B2 * | 8/2020 | Sridharan | G06V 10/267 |
| 2001/0044738 A1 * | 11/2001 | Elkin | G06Q 10/06316 705/7.15 |
| 2004/0003352 A1 * | 1/2004 | Bargeron | G06F 16/9535 715/230 |
| 2004/0019846 A1 * | 1/2004 | Castellani | G06Q 10/10 715/229 |
| 2004/0085354 A1 * | 5/2004 | Massand | G06F 40/197 715/751 |
| 2005/0131897 A1 * | 6/2005 | Grasso | G06F 16/9535 |
| 2005/0234943 A1 * | 10/2005 | Clarke | H04L 67/38 |

(Continued)

FOREIGN PATENT DOCUMENTS

WO   WO-2019241041 A1 *  12/2019  .......... G06F 16/176

OTHER PUBLICATIONS

National Center for Complementary and Integrative Health "Version Control Guidelines", published Apr. 24, 2013, accessed Jan. 22, 2022; (Year: 2013).*

(Continued)

*Primary Examiner* — Andrew Chase Lakhani
(74) *Attorney, Agent, or Firm* — Caleb D. Wilkes

(57) ABSTRACT

A system for generating of posts, the system including: a server; and a network connection for the server; the server to: maintain a database of users and corresponding user behavior when generating a post on a specific topic; match a first user generating a current post and a topic of the current post to user behavior in the database; based on the matching user behavior from the database, identify different versions during development of the current post; and dictate distribution of different versions of the post based on the matching user behavior from the database.

20 Claims, 6 Drawing Sheets

(56) References Cited

U.S. PATENT DOCUMENTS

| | | | |
|---|---|---|---|
| 2006/0026502 A1* | 2/2006 | Dutta | H04L 12/1822 715/230 |
| 2007/0271502 A1* | 11/2007 | Bedi | G06F 40/186 715/230 |
| 2008/0071872 A1* | 3/2008 | Gross | G06F 16/35 709/206 |
| 2009/0300705 A1* | 12/2009 | Dettinger | G06F 21/10 726/1 |
| 2011/0252312 A1* | 10/2011 | Lemonik | G06F 40/186 715/255 |
| 2011/0302004 A1* | 12/2011 | Johnson | G06Q 10/06398 705/7.42 |
| 2013/0185252 A1* | 7/2013 | Palmucci | G06F 40/197 707/608 |
| 2014/0365579 A1* | 12/2014 | Thrasybule | G06F 40/197 709/205 |
| 2015/0081417 A1* | 3/2015 | Golden | G06Q 30/0269 705/14.41 |
| 2016/0179820 A1 | 6/2016 | Roth et al. | |
| 2017/0286096 A1* | 10/2017 | Mathur | H04L 67/1095 |
| 2019/0250780 A1* | 8/2019 | Feng | G06Q 10/101 |
| 2019/0384833 A1* | 12/2019 | Estes | G06F 16/93 |

OTHER PUBLICATIONS

Lorna Maguire, "Version Control Guidance", University of Aberdeen, Jul. 2017, accessed Jan. 20, 2022; (Year: 2017).*

Wang et al, "How Data Scientists Use Computational Notebooks for Real-Time Collaboration", Proceedings of the ACM on Human-Computer Interaction, vol. 3, Article 39, pp. 1-30 (Nov. 7, 2019) (Year: 2019).*

* cited by examiner

SYSTEM FOR SOCIAL VERSIONING

BACKGROUND

This specification relates to the area of revision control of documents, including posts to media streams. Specifically, this specification relates to the control and distribution of multiple versions of a document to different people and/or streams.

SUMMARIES

This specification describes a system for generating of posts, the system including: a server; and a network connection for the server; the server to: maintain a database of users and corresponding user behavior when generating a post on a specific topic; match a first user generating a current post and a topic of the current post to user behavior in the database; based on the matching user behavior from the database, identify different versions during development of the current post; and dictate distribution of different versions of the post based on the matching user behavior from the database.

This specification describes a system for managing distribution of posts, the system including: a processor, and a memory functionally connected to the processor and containing instructions, which when executed by the processor, cause the processor to: identify a first post by a first user on a topic; identify a model workflow for the first post, where the model workflow is based on workflows for posts with characteristics similar to the first post; identify a next step for the first post in the model workflow; and perform the identified next step in the workflow without user intervention.

This specification describes a computer program product, the computer program product including a computer readable storage medium having program instructions embodied therewith, the program instructions executable by a processor to cause the processor to: identify a notification to a first user concerning a post posted to a feed; determine a workflow based on the content of the post and the first user's history; block the notification if the workflow indicates the user will not respond to the post;

DETAILED DESCRIPTION

Figure 1:
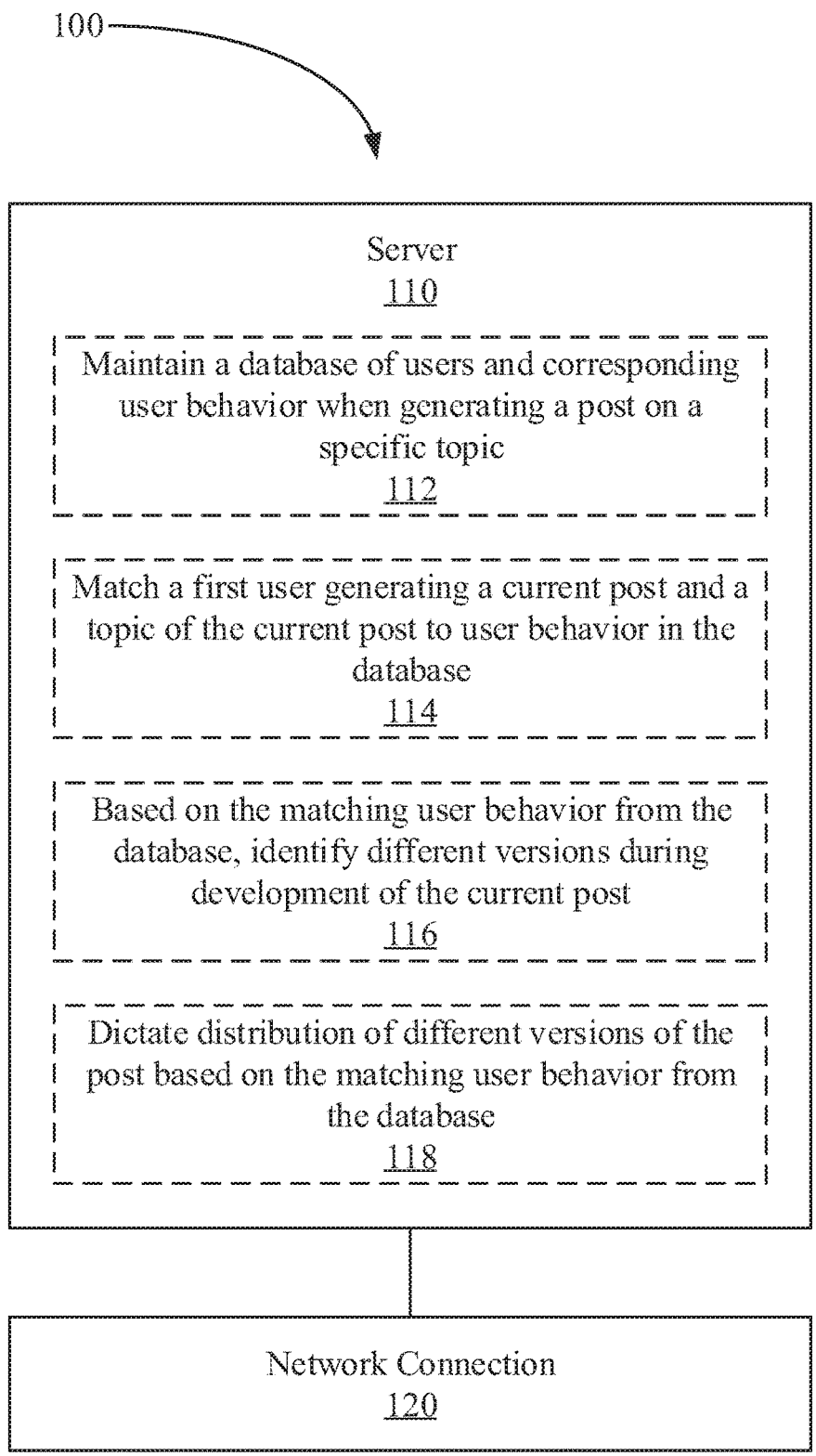
FIG. 1 depicts a system for generating of posts according to an example of principles described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Individuals, groups, organization, and companies have begun to rapidly communication with the public using new tools, such as blogs, feeds, social media pages, etc. However, before content is publically posted, it may be desirable to have someone review, revise, edit, and/or approve the content. In some organizations, publicly presented content goes through an orderly process of production, review, approval, and publication. However, such processes are often dependent on individuals tracking and distributing different versions of the content. Such processes are vulnerable to errors, including providing the wrong version of a document to someone. For example, an earlier draft may be provided to an approver for approval rather than an updated, revised version of the content. Markups and/or unedited content may be posted to the public with negative consequences.

As used in the present specification and in the appended claims, the term "a number of" or similar language is meant to be understood broadly as any positive number including 1 to infinity.

Turning now to the figures, FIG. 1 depicts a system (100) for generating of posts, the system (100) including: a server (110) and a network connection (120) for the server (110); the server (110) to: maintain a database of users and corresponding user behavior when generating a post on a specific topic (112); match a first user generating a current post and a topic of the current post to user behavior in the database (114); based on the matching user behavior from the database, identify different versions during development of the current post (116); and dictate distribution of different versions of the post based on the matching user behavior from the database (118).

A system (100) is a system (100) for generating posts. The system (100) monitors the versions of posts to reduce providing the wrong version of a post to a stream, individual, and/or group. The system uses the behavior of the user and/or similar users.

A server (110) is a device used for running one or several server programs. On a network, such a device is called a host.

A network connection (120) may be a connection to a local network and/or an external network. In an example, the network connection (120) is to an organization's internal network, e.g., an intranet. The network connection (120) may connect to the Internet. The network connection (120) may access external storage, for example, cloud resources.

The server (100) maintains a database of users and corresponding user behavior when generating a post on a specific topic (112). The database may be stored on local storage. The database may be stored on storage accessible through the network connection. The database includes information on posts by users. The database may include compilation of posting history and responses from a group of users. In an example; posts of the database have topics associated with them. The topics may be extracted from the content of the posts. The topics may be assigned by a user. The topics may be determined automatically but confirmed by a user.

The server (110) matches a first user generating a current post and a topic of the current post to user behavior in the database (114). The user behavior in the database may include recipients to whom a corresponding user has previously sent a post. The user behavior in the database may include an order in which the recipients were sent a previous post.

The user behavior may include the behavior of the user generating the post such as the identity of the user generating the post, the initial recipient(s) of the post, the time of the day and/or week the post was generated, pervious posts on a shared topic, etc. The user behavior may include behavior of other users besides the user generating the post. For example, the time from receipt to read, the time to forward and/or respond to the post, the amount of comments/markup to the post, the type of comments to the post, etc. The user behavior may involve multiple groups of users who receive different versions of the post.

Based on the matching user behavior from the database, the server (110) identifies different versions during development of the current post (116). The different versions may be different versions created by the user generating the post. The different versions may be generated by different users, for example, a draft and a redline of the draft may be two different versions of a document created by an author and an editor respectively.

The server (110) dictates distribution of different versions of the post based on the matching user behavior from the database (118). For example, the server (110) may recommend to whom a version of the post should be communicated based on the matching user behavior. The server (110) may deter urine that the current post is in a final version and distributing the final version of the post to all recipients. The server may distribute a first version to a first group for review; identify corrections and/or changes accepted by the first group and distribution a second version including the corrections and changes to a second group.

In an example, the server (110) identifies a new version of the post when the first user communicates with another user about the current post. The server (110) may identify a new version of the post from a reply, a reply all, and/or a forward from a second user, in another example, the server (110) performs a text and/or natural language comparison between the new post and the first post to determine if the new post is a version of the first post.

In the figures, elements shown in dashed boxes indicate functionality provided by the associated device and/or system. For example, the server (110) performs the actions of: maintain a database of users and corresponding user behavior when generating a post on a specific topic (112); match a first user generating a current post and a topic of the current post to user behavior in the database (114); based on the matching user behavior from the database, identify different versions during development of the current post (116); and dictate distribution of different versions of the post based on the matching user behavior from the database (118), The dashed boxes may be implemented using hardware, software, and/or mixtures thereof.

In the figures, elements shown with solid boxes indicate devices associated with the provided dashed box functionalities. For example, iii FIG. 1, the server (110) is performing the activities of (112, 114, 116, and 118).

Figure 2:
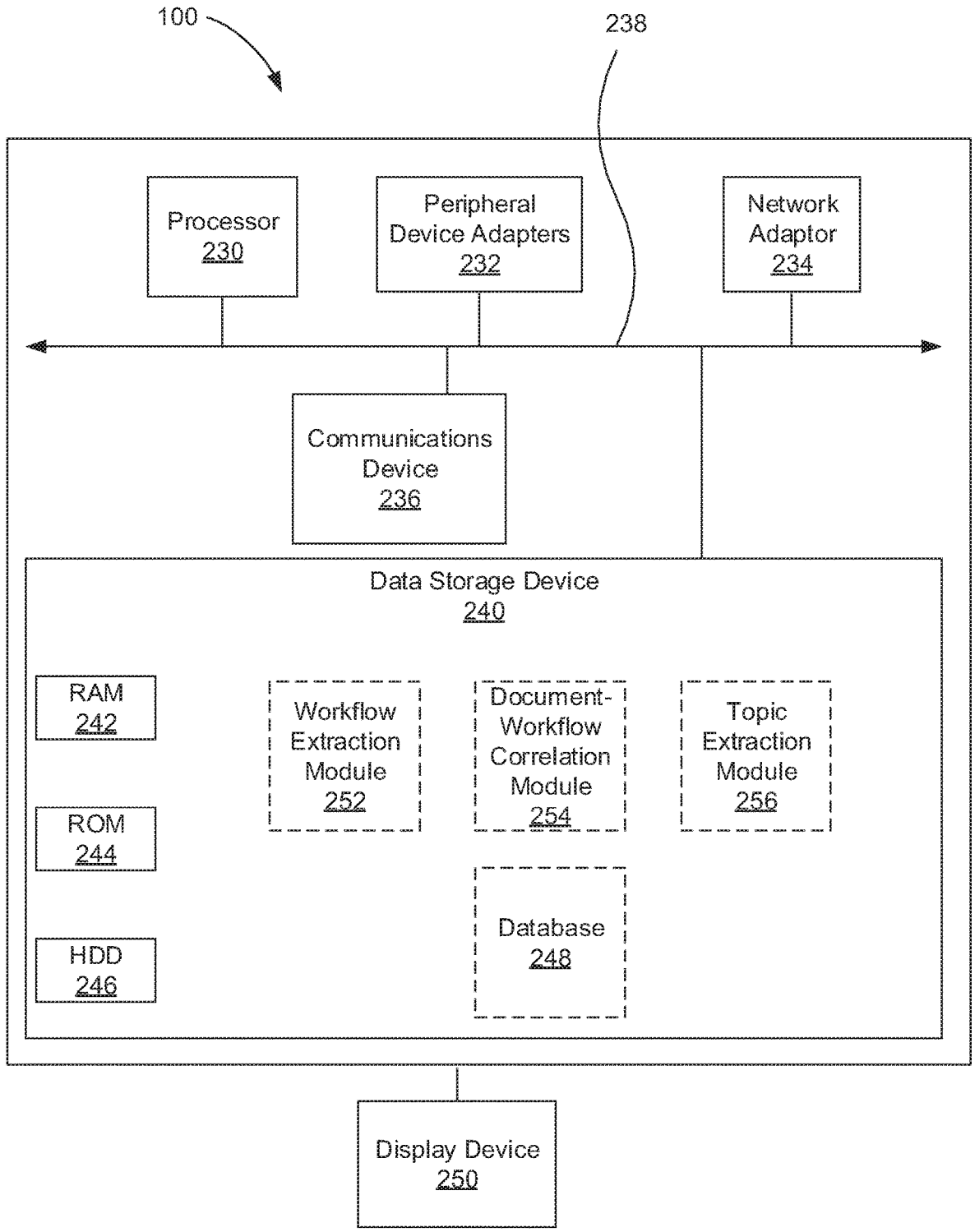
FIG. 2 is a diagram of a computing device (100) for document management, according to an example of the principles described herein.

FIG. 2 is a diagram of a computing device (100) for document management, according to an example of the principles described herein. The computing device (100) may be implemented in an electronic device. Examples of electronic devices include servers, desktop computers, laptop computers, personal digital assistants (PDAs), mobile devices, smartphones, gaming systems, and tablets, among other electronic devices.

The computing device (100) may be utilized in any data processing scenario including, stand-alone hardware, mobile applications, through a computing network, or combinations thereof. Further, the computing device (100) may be used in a computing network. In an example, the methods provided by the computing device (100) are provided as a service over a network by, for example, a third party.

To achieve its desired functionality, the computing device (100) includes various hardware components, Among these hardware components may be a number of processors (230), a number of data storage devices (240), a number of peripheral device adapters (232), and a number of network adapters (234). These hardware components may be interconnected through the use of a number of busses and/or network connections. In an example, the processor (230), data storage device (240), peripheral device adapters (232), and a network adapter (234) may be communicatively coupled via a bus (238).

First, the computing device (100) includes a communication device (236) which refers to hardware used to pass information to and/or from a meeting participant.

The processor (230) may include the hardware architecture to retrieve executable code from the data storage device (240) and execute the executable code. The executable code may, when executed by the processor (230), cause the processor (230) to provide a summary of a previously covered topic to a user joining a meeting. The functionality of the computing device (100) is in accordance to the methods of the present specification described herein. In the course of executing code, the processor (230) may receive input from and provide output to a number of the remaining hardware units.

The data storage device (240) may store data such as executable program code that is executed by the processor (230) and/or other processing device. The data storage device (240) may specifically store computer code representing a number of applications that the processor (230) executes to implement at least the functionality described herein.

The data storage device (240) may include various types of memory modules, including volatile and nonvolatile memory. For example, the data storage device (240) of the present example includes Random Access Memory (RAM) (242), Read Only Memory (ROM) (244), and Hard Disk Drive (HDD) memory (246). Other types of memory may also be utilized, and the present specification contemplates the use of many varying type(s) of memory in the data storage device (240) as may suit a particular application of the principles described herein, in certain examples, different types of memory in the data storage device (240) may be used for different data storage needs. For example, in certain examples the processor (230) may boot from Read Only Memory (ROM) (244), maintain nonvolatile storage in the Hard Disk Drive (HDD) memory (246), and execute program code stored in Random Access Memory (RAM) (242).

The data storage device (240) may include a computer readable medium, a computer readable storage medium, or a non-transitory computer readable medium, among others. For example, the data storage device (240) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The data storage device (240) may include a database (248). The database (248) may include users. The database (248) may include topics. The database (248) may include records of previous post and/or documents. The database (248) may include extracted workflows for a post and/or document Hardware adapters, including peripheral device adapters (232) in the computing device (100) enable the processor (230) to interface with various other hardware elements, external and internal to the computing device (100). For example, the peripheral device adapters (232) may provide an interface to input/output devices, such as, for example, display device (250. The peripheral device adapters (232) may also provide access to other external devices such as an external storage device, a number of network devices such as, for example, servers, switches, and routers, client devices, other types of computing devices, and combinations thereof.

The display device (250) may be provided to allow a user of the computing device (100) to interact with and implement the functionality of the computing device (100). The peripheral device adapters (232) may also create an interface between the processor (230) and the display device (250), a printer, and/or other media output devices. The network adapter (234) may provide an interface to other computing devices within, for example, a network, thereby enabling the transmission of data between the computing device (100) and other devices located within the network.

The computing device (100) may, when executed by the processor (230), display the number of graphical user interfaces (GUIs) on the display device (250) associated with the executable program code representing the number of applications stored on the data storage device (240). The GUIs may display, for example, interactive screenshots that allow a user to interact with the computing device (100). Examples of display devices (250) include a computer screen, a laptop screen, a mobile device screen, a personal digital assistant (PDA) screen, and a tablet screen, among other display devices (250).

The computing device (100) further includes a number of modules (252-256) used in the implementation of the systems and methods described herein. The various modules (252-256) within the computing device (100) include executable program code that may be executed separately. In this example, the various modules (252-256) may be stored as separate computer program products. In another example, the various modules (252-256) within the computing device (100) may be combined within a number of computer program products; each computer program product including a number of the modules (252-256), Examples of such modules include a workflow extraction module (252), a document-workflow correlation module (254), and a topic extraction module (254).

In FIG. 2, the dashed boxes indicate instructions (252, 254, 256) and a database (248) stored in the data storage device (240). The solid boxes in the data storage device (240) indicate examples of different types of devices which may be used to perform the data storage device (240) functions. For example, the data storage device (240) may include any combination of RAM (242), ROM (244), HDD (246), and/or other appropriate data storage medium, with the exception of a transient signal as discussed above.

Figure 3:
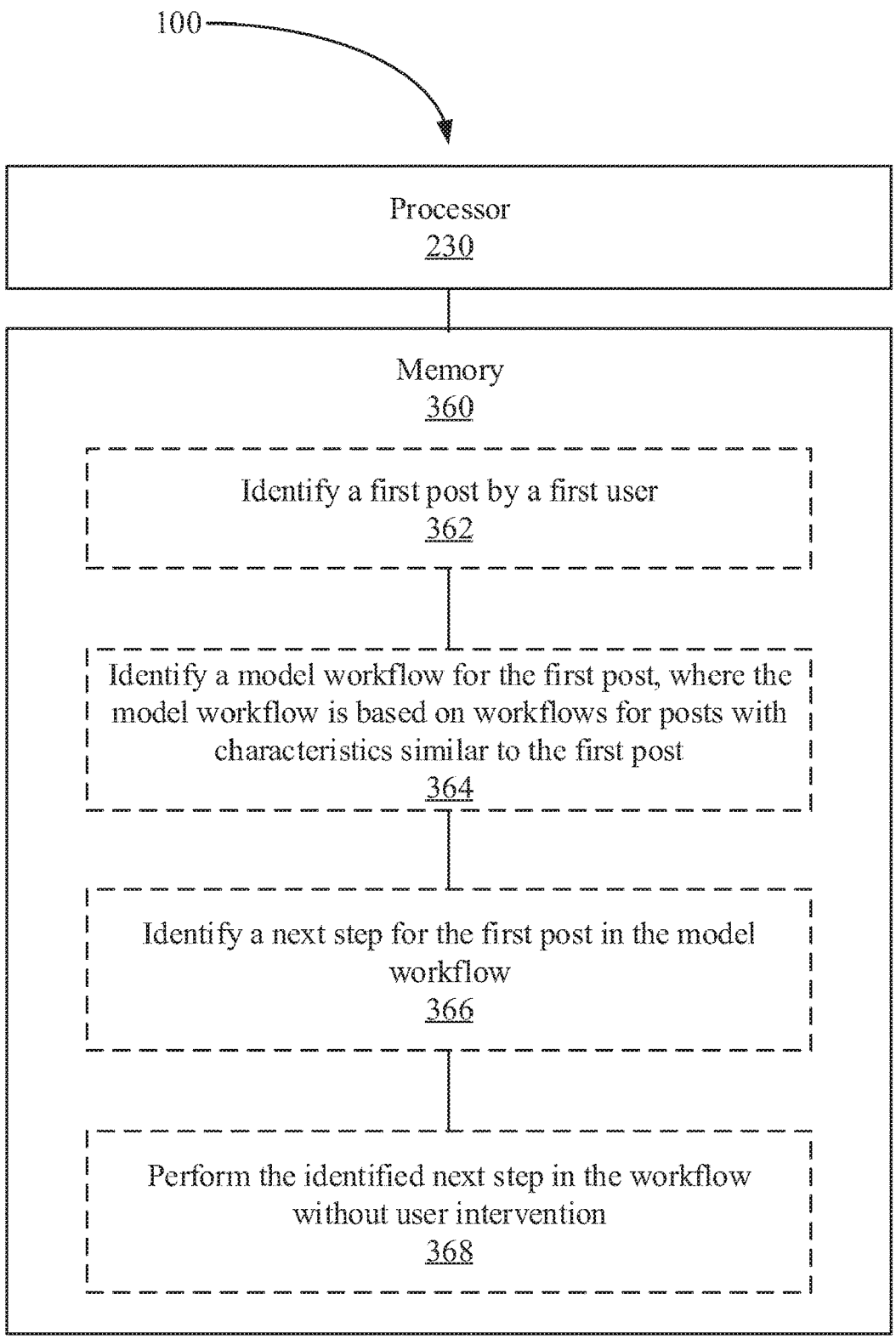
FIG. 3 depicts a system for managing distribution of posts according to an example of principles described herein.

FIG. 3 depicts a system (100) for managing distribution of posts, the system (100) including: a processor (230), and a memory (360) functionally connected to the processor (230) and containing instructions, which when executed by the processor (230), cause the processor (230) to: identify a first post by a first user on a topic (362); identify a model workflow for the first post, where the model workflow is based on workflows for posts with characteristics similar to the first post (364); identify a next step for the first post in the model workflow (366); and perform the identified next step in the workflow without user intervention (368).

The system (100) is a system for managing distribution of posts, where the posts contain different versions. The system (100) monitors the exchange of related posts until a final version is identified and then distributes the final version to a group and/or stream. The system (100) may update posts based on intermediate action by users.

Consider the following example, User 1 sends a post to Users 2 and 3, User 2 edits the post and responds to User 1 but not User 3. Recognizes that User 3 now has an obsolete version of the post and updates User 3 on the current version. Thus when User 3 reviews the post, User 3 starts with the current version rather than an obsolete version of the post. The system (100) my further identify that a post will be ready for finalization after Users 2 and 3 have provided editing/feedback based on previous workflows on a similar topic by the same users. Accordingly, the system (100) may prompt User 3 for feedback after a given amount of time has expired. The system (100) may access a calendar system and recognize that User 3 is unavailable. The system (100) may identify another user to provide feedback in place of User 3. They system (100) may prompt User 1 to determine if User 1 wishes to bypass User 3's feedback.

The processor (230) may be a single processor. The processor (230) may include multiple processors (230), for example, a multi-core processor (230). The processor (230) may include multiple processors (230) in multiple devices.

The associated memory (360) is accessible by the processor (310) such that the instructions from the associated memory (360) are processed by the processor (310) to perform the described operations. The associated memory (360) may be stored locally. The associated memory (360) may be accessed over a network. The instructions may be present in their entirety in the associated memory (360). The instructions may be loaded into the associated memory (360) from a data storage device (240). In an example, portions of the instructions are loaded as needed from the storage device (240). The associated memory (360) may be a storage device (240). Recent trends in computing system continue to blur the difference between memory such as RAM and/or ROM and storage including solid state drives (SSD).

The instructions include instructions to identify a first post by a first user on a topic (362). The instructions may include identifying a topic in a post and reviewing recent posts received by the first user and/or sent by the first user which share the topic, Some systems mark posts as forwards and/or replies to indicate that they are not a first post. The language in the post may be analyzed to determine if the post is a first post. Posts which reference a previous post for example may not be a first post. Care should be taken as language may reference other communications not seen by the system (100). For example, a post may reference a discussion in a meeting, this may still be a first post despite indicating previous activity. Such posts may use a different workflow than de novo posts.

The instructions include instructions to identify a model workflow for the first post, where the model workflow is based on workflows for posts with characteristics similar to the first post (364). Characteristics used to determine match to a model workflow may include: topic, author of the post, recipients(s) of the post, other posts generated recently by the author, time of day, time of week, time of month, associated activity on the author's schedule.

For example, if Lucy always sends out a post after a staff meeting to the staff and management with action items discussed, some characteristics may include the presence of action items in the document, the author, the distribution list, etc. If Sam sends the message out in place of Lucy but forgets someone who routinely receives the message, such as Lucy's supervisor, the system (100) may identify the commonality of the two messages despite the change in authorship and apply the same workflow to them, including prompting Sam about providing a copy to the omitted supervisor. If Lucy has her assistant check the message prior to broad distribution, the system (100) may prompt same to have the assistant review the message prior to general distribution. Such prompts can avoid errors and/or omissions by capturing the routine processes used by a group and/or organization. Further, analysis of the workflow models may provide the ability to apply quality tools to processes.

The instructions include instructions to identify a next step for the first post in the model workflow (366). In an example, the next step is to distribute the post to a user or group of users. The next step may be to post the post to a stream. The next step may be to update an obsolete version previously provided to a user that has subsequently been edited.

The instructions include instructions to perform the identified next step in the workflow without user intervention (368). In an example, the system provides a notification to a user, such as the originator, about the action being performed. This notification may be provided prior to the action being taken and/or after the action being performed. This notification may be an email, a text, etc. The notification may be updating a symbol in a display. In an example, the system displays when users have obsolete versions of a document and/or post and then displays when this has been corrected.

For example, the system (100) may display a list of user names who have received the document, with those having a current version displayed in green and those having an obsolete version marked red. A user currently editing a document may be indicated by a third color. Users who have opened and/or read the current document may be indicated also. This activity could be a check mark and/or another color, Finally, users who the system has determined are unavailable may be indicated by color, symbol, text, etc. In an example, this display is accessible from a list of recent documents and/or posts. The system may also indicate a finalization state for a document and/or post. For example, by showing a small lock and/or other indicator. This type of interface allows a user to rapidly assess the status of a document and what steps could be taken to advance the document in its workflow.

The system (100) may automatically assign version identifiers different versions of the document. In an example, the version identifiers are time and/or date stamps. The version identifiers may be numbers. The system (100) may distinguish major and minor versions, for example, a major version may roll the one's place and a minor version update may increment a number right of a decimal point. In an example, major revisions are revisions by the author and minor revisions are revisions by users other than the original author. So an author might distribute a 1.0 version and receive back edits 1.1, 1.2, and 1.3 from three reviewers. The author may then distribute a final version 2.0 which is approved as 2.1 by a gatekeeper. Such revisions may be visible to a user, for example, as part of a status display, and/or may be internal for tracking purposes. The identifiers may use letters and/or other sequences to track revisions.

The system (100) may identify a most valuable reader in relation to a workflow. For example, feedback from peers may be added but feedback from a supervisor may cause the document to be released. The system (100) may distinguish optional and necessary steps in the workflow, in an example, feedback from one user among a group of users is sufficient to advance but the user providing that feedback can be any user among a group of users, e.g., any director and/or any board member.

The system (100) may include timeouts. A timeout is a minimum amount of time provided to the users before the system automatically applies a next step. Different steps may include different lengths of timeout. Timeouts may be determined on an actual time-scale and/or a working-hours time-scale. Working-hours may exclude weekends and organizational holidays. This may reduce documents generated on Friday afternoon from being acted on over a weekend. For example, a timeout could be 72 hours and/or 10 work-hours.

In FIG. 3, the solid boxes indicate physical components, for example, a memory (360) and an associated processor (230) which make up the system (100). The dashed boxes (362, 364, 366, 386) are instructions stored in the memory (360) which cause the described actions when processed by the processor (230). Specifically, the instructions cause the processor (230) to: identify a first post by a first user on a topic (362); identify a model workflow for the first post, where the model workflow is based on workflows for posts with characteristics similar to the first post (364); identify a next step for the first post in the model workflow (366); and perform the identified next step in the workflow without user intervention (368)

Figure 4:
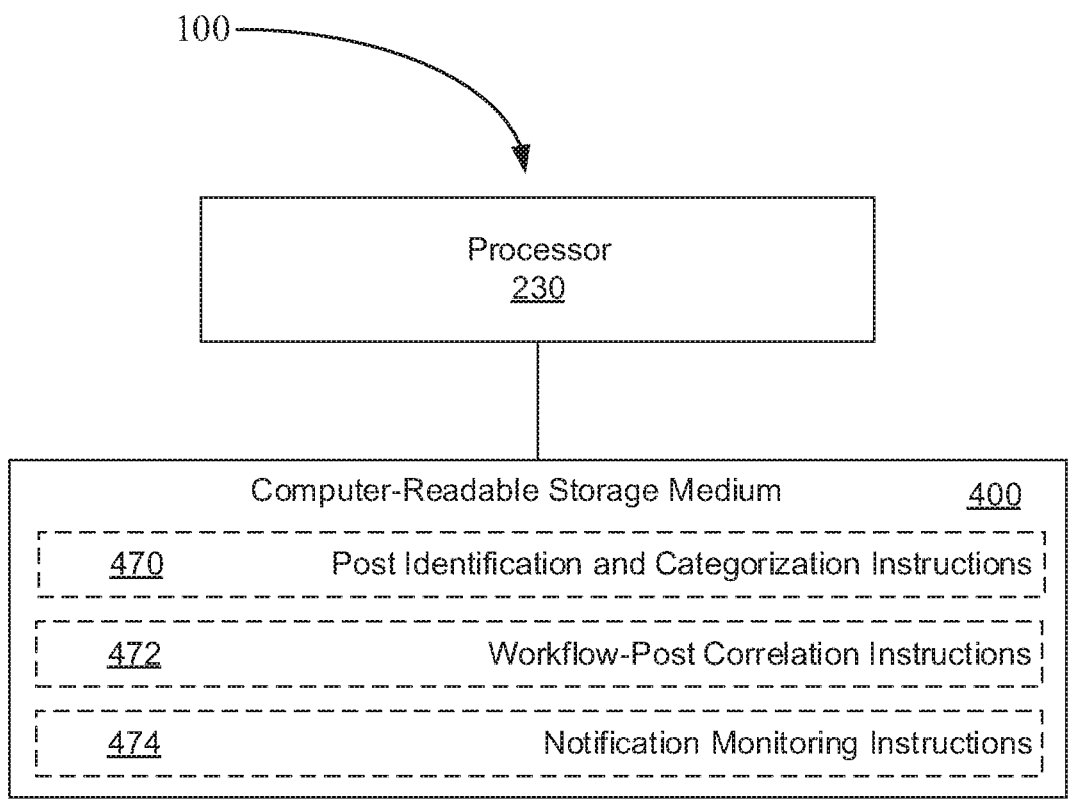
FIG. 4 depicts a computer program product according to principles described herein.

FIG. 4 depicts a computer readable storage medium (400) for managing meetings, according to an example of principles described herein. To achieve its desired functionality, a computing system includes various hardware components. Specifically, a computing system includes a processor (230) and a computer-readable storage medium (400). The computer-readable storage medium (400) is communicatively coupled to the processor (230). The computer-readable storage medium (400) includes a number of instructions (470, 472, 474) for performing a designated function. The computer-readable storage medium (400) causes the processor (230) to execute the designated function of the instructions (470, 472, 474). The designated functions include, but are not limited to: Post Identification and Categorization Instructions (470), Workflow-Post Correlation Instructions (472), and Notification Monitoring Instructions (474).

The computer readable storage medium (400), as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A computer readable storage medium (400) may include:

The instructions include post identification and categorization instructions (470). These instructions identify relevant characteristics of the post. Relevant characteristics are characteristics which will allow correlations with a workflow. Examples of such characteristic include: post length, topics, post author, post recipients, post structure, etc. Users, either author or recipient, may be extrapolated based on title, job description, functional group, experience level, area of expertise, and/or other properties to describe characteristics. For example, a workflow may go to the head of marketing, even if a head of marketing has joined the company. In an example, the system may users who are no longer available, due to vacation, departure, scheduling, etc. and also identify substitute and/or equivalent users who may be able to fill the role in the workflow. For example, if legal includes two contract review attorneys and one is unavailable, the system (100) may identify the other as a substitute. The system may identify a manager of the attorney as a substitute. Similarly, the system (100) may note delegation by the manager as indicating an appropriate substitute for similar matters.

The instructions include workflow-post correlations instructions (472). The system (100) identifies a workflow which matches the new post. In an example, the system (100) rates the match of the new post to each of multiple identified workflows. The system (100) may select the highest rated workflow. The system (100) may include a cutoff M order to consider a workflow matching.

The system (100) may include frequency in the rating. For example, if a user has a first workflow used 98% of the time and a match of 0.73 (on a scale of 0 to 1) and a second workflow used 2% of the time and a match of 0.74, the system May select the more commonly used workflow despite the first workflow being a worse match. Similarly, the system (100) may discount older behavior and/or workflows when matching a workflow to a new post.

The instructions include notification monitoring instructions (474), The system (100) identifies notifications and intercepts them. The system (100) may compare the notifications against the workflow in order to determine whether to allow the notification. In an example, the system (100) blocks notifications that have not produced actions in similar situations by a user. The system (100) may provide the user with a query about modifying the workflow to remove and/or move a notification. This can be useful in reducing the number of unwanted notifications from a system. For example, a manager may desire not to be notified about intermediate drafts and only be notified when the finalized draft is ready for final review and/or release. Similarly, a user may not have a preference on her group's discussion about where to go for lunch but desires only a notification when a final decision has been reached.

In FIG. 4 the solid lined boxes indicate physical components, for example, the computer readable storage medium (400) and the processor (230) which make up the system (100). The dashed boxes indicate the instructions stored on the computer readable storage medium (400), which when executed, cause the processor (230) to perform the described activities. Specifically, the computer readable storage medium (400) includes instructions which cause the processor (230) to: identify and categorize posts (470), correlation a post with a workflow (472), and monitor notifications (474).

Figure 5:
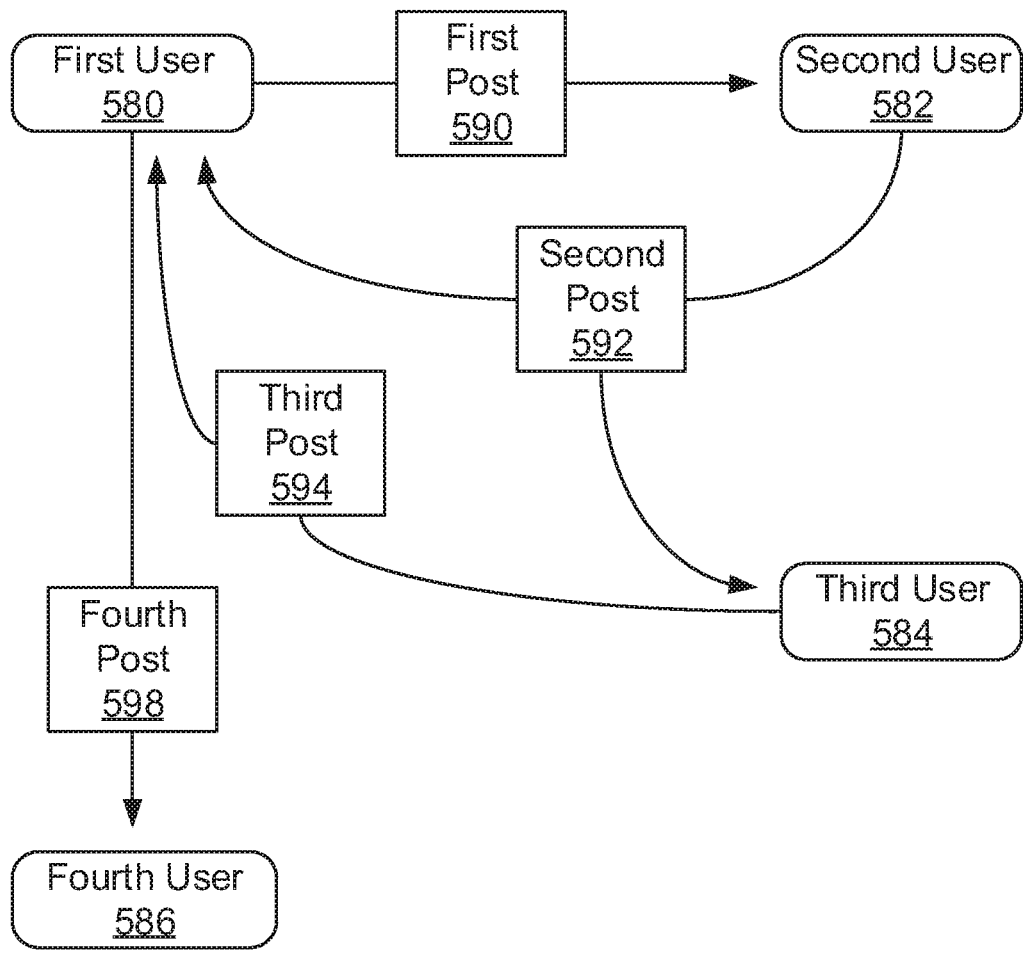
FIG. 5 shows an example of a workflow consistent with the principles described in this specification.

FIG. 5 shows an example of a workflow consistent with the principles described in this specification. The workflow includes a first post (590) generated by a first user (580). The first post (590) is provided to a second user (592). The second user modifies the first post (590) producing the second post (592) and provides the second post (592) to the first user (580) and a third user (584), The third user (584) provides additional edits creating the third post (594) and sends the third post (594) to the first user (580). The first user (580) integrates the edits and creates a fourth post (598) which is forwarded to a fourth user (586). The system (100) tracks the exchanges between the users and based on an extracted workflow determines that the fourth post (598) as a final version of the post. Based on this determination, the system (100) posts the fourth post (598) to a stream. This is a very simple workflow and much more complex workflows involving larger numbers of individuals, groups, organizations, etc. with many more versions of the post can readily be envisioned.

Figure 6:
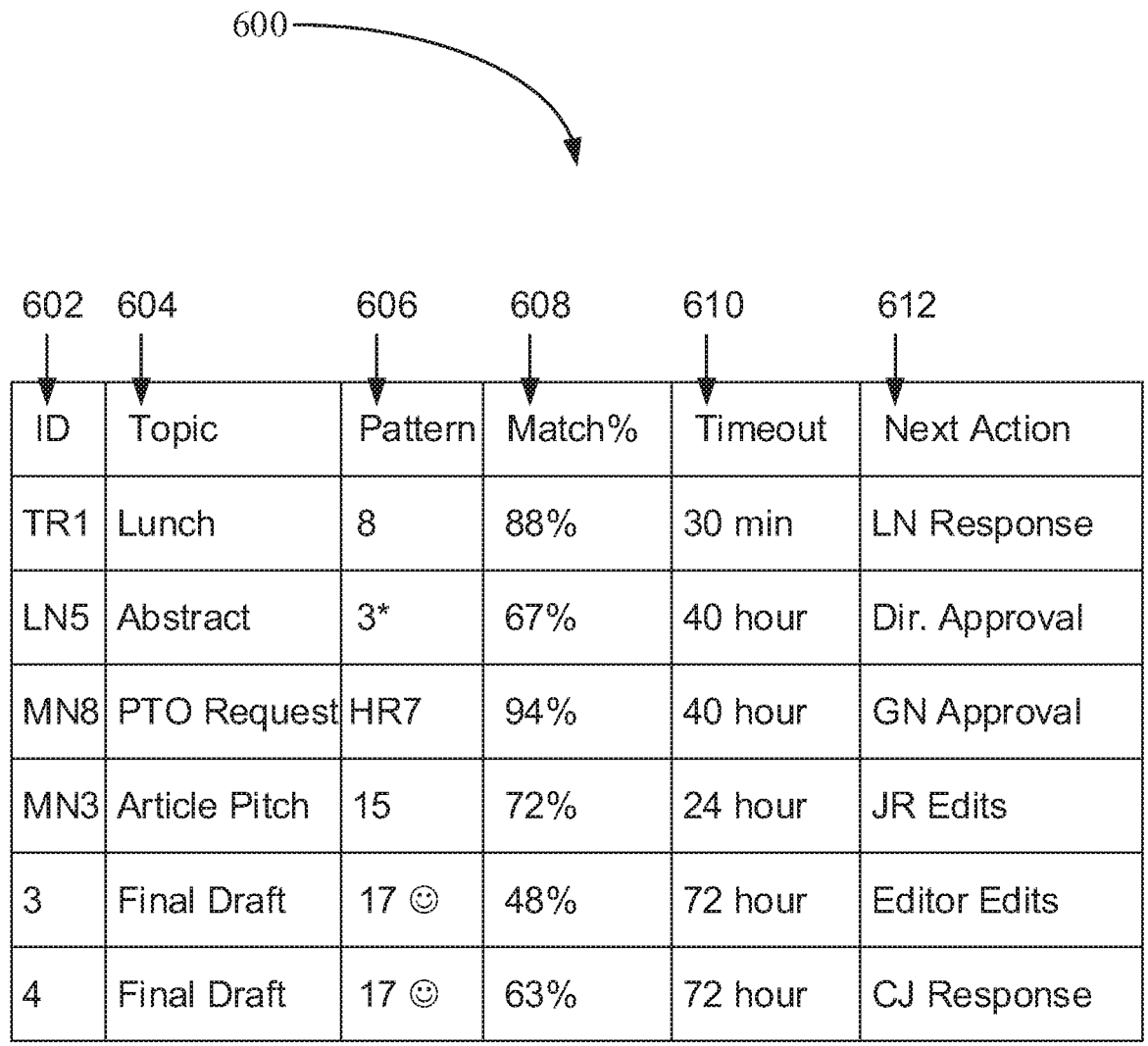
FIG. 6 shows an example of a graphic user interface (GUI) displaying a system status in an example consistent with the principles described in this specification.

FIG. 6 shows an example of a graphic user interface (GUI) (600) displaying a system status in an example consistent with the principles described in this specification. In this example, the GUI (600) includes an identifier (ID) (602) for a document and or post, a topic (604) identified for the document or post, a pattern and/or workflow (606) associated with the document or post, an evaluation of the fit of the flow to the identified workflow, expressed as a match percentage (608), a timeout (610) until next action happens automatically, and/or a next action (612) in the pattern/workflow.

The GUI (600) may include a column with an identifier (ID) (602) associated with a document and/or post. The identifier (602) may include a creator's initials. The identifier (602) may drop the initials for the user's posts. The identifier (602) may include a number, letter, and/or symbol to indicate a current revision of the document.

The GUI (600) may include a column identifying a topic (604) associated with the document and/or post. The topic (604) may be determined by the system (100). The topic (604) may be provided by a user. The topic (604) may be edited and/or updated by a user. A document may include multiple topics (604). For example, a document could have the topics (604) of final draft, New York, and musical. In an example, the highest rated topic (604) is displayed. In an example, all topics (604) are displayed. In an example, a category topic (604) is preferred over a content topic for display. In an example, clicking on the heater (604) flips the display between category topic (604) and content topic (604).

The GUI (600) may display the workflow and/or pattern (606) identifier assigned to a document and/or post. The system (100) may automatically assign the pattern (606) on the match percentage (608). A user may assign the pattern (606) or selected the pattern (606) to be used. The pattern (606) may be assigned numbers, or more useful codes. For example, the pattern for the paid time off request (PTO request) has been assigned an identifier HR7 indicating this pattern (606) is a Human. Resources (HR) related pattern (606). Different pattern (606) identifiers may be provided for reviewed and/or standardized workflows. For example, patterns (606) that are machine generated and have not been reviewed and/or not yet approved by a human may be marked with an asterisk or similar symbol. Commonly used patterns (606) for a user may be marked to indicate favorites, for example, with a smiley face and/or other symbol.

The GUI (600) may display a match percentage (608) of the document/post pattern with the assigned pattern (606). Higher matches indicating greater correlation between the document/post and the workflow/pattern (606). In an example, match percentage (608) values below a threshold may produce a flag and/or other warning to attract a user's attention. In an example, the threshold is calculated dynamically to flag a fixed percentage of documents and/or posts (for example, 10%, 5%, 2%, and/or 1%). The threshold may be linked to a specific pattern (606) rather than globally. The threshold may be disabled until a specific pattern (606) has been used in a suitable number of instances to reliably identify unusual occurrences.

The GUI (600) may include a timeout (610) for the next action (612). The timeout (610) may be the total time provided before a next action (612) is automatically performed. The timeout (610) may be a countdown timer until the next action (612) is automatically performed. In an example, clicking on the header for the timeout (610) column toggles between these two display modes.

The GUI (600) may display the next action (612) in the pattern (606) associated with a document and/or post. The next action (612) may be an approval, a review, an edit, a comment, publication, distribution, and/or other activity the system (100) may perform on the document and/or post. The next action (612) may have an associated individual, for example, identified by initials. The next action (612) may have an associated responsibility level, for example, identified by title, e.g. director (Dir.). In an example, clicking on the next action (612) causes the system to perform the next action (612) and/or bypass the next action (612). Clicking the next action (612) box may cause the system (100) to display options, for example: approve, disapprove, ignore, bypass, etc., for a user to select. The system (100) may include a confirmation for such an action. The system (100) may include a password and/or other security measure to confirm an action.

The GUI (600) provides a new and effective way of monitoring the progress of documents and/or posts through their workflows. The GUI (600) provides a way of identifying bottlenecks and/or delayed activities. The GUI (600) provides an improved way to monitor and evaluate the status of these workflows for a user. The GUI (600) provides a mixture of words, numbers, and/or symbols to provide the information in a compact and accessible format. Further, allowing toggling of modes allows a user to rapidly configure the GUI (600) to reflect their preferred and/or current needs. Accordingly, the GUI (600) is an improved user interface compared with, for example, accessing one's email to determine which draft was sent to whom and when and then trying to determine who has responded. The GUI (600) explicitly identifies the next action (612) which can be very helpful for new employees trying to manage existing processes. Finally, the ability to edit the workflows/patters and review and/or favorite patterns can reduce missed steps and errors. Workflows may act as checklists prior to a document and/or post distribution, guiding a user through the normal steps to avoid or reduce predictable errors.

The system (100) as described herein provides an improvement to the function of a computer system. Computer systems process large amounts of documents and posts, however, the ability of the system (100) to identify normal and abnormal behavior and to track activities against normal behavior have been limited at best. While humans tend to do such pattern recognition and categorization naturally, computers require specific instructions to accomplish similar tasks. Unfortunately, this can result in computer systems failing to flag atypical behavior or failing to process normal behavior. The presented approach of forming workflows which are then reviewable and/or selectable by experienced users removes the minutia tracking from humans who are not great at it and the pattern recognition and normal/abnormal evaluations from computers who are not great at that. The result is a system (100) that offloads the bookkeeping from the user while allowing the user to effectively track and manage document progression through a workflow.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating of posts, the system comprising:
    a server; and
    a network connection for the server;
    the server to:
        maintain a database of users and corresponding user behavior in a social media network when generating a social media post on a specific topic to be published in the social media network;
        match a first user generating a current social media post and a topic of the current social media post to the user behavior in the database;
        identify multiple model workflows for the current social media post, wherein a model workflow:
            comprises instruction code to execute actions associated with the current social media post:
            is based on workflows for social media posts with characteristics similar to the current social media post, and
            identifies a second user and a third user to whom the current social media post is to be sent for review;
        compare characteristics for each model workflow with characteristics of the current social media post;
        express, for each model workflow, a match between the characteristics of the current social media post and each multiple model workflow as a match percentage;
        identify a frequency of use for each model workflow;
        select a model workflow for the current social media post based on the match and frequency of use, wherein a first model workflow with a higher frequency of use is selected over a second model workflow with a higher match percentage;
        identify the second and third user based on a selected model workflow;
        track the current social media post between the first, second, and third users to identify different versions during development of the current social media post based on:
            detecting when the first user communicates with the second user and the third user about the current social media post; and
            based on natural language comparison between the different versions of the current social media post:
        visually indicate a state of different versions of the current post with icons;
        distribute, by the server and without user intervention, different versions of the current social media post based on the matching user behavior from the database by:
            distributing a first version of the current social media post to the second user and the third user for review;
            accessing a calendar system for the second user and the third user to determine an availability of the second user and the third user;
            identifying that the second user or the third user is unavailable based on a determined availability from the calendar system; and
            responsive to identifying an unavailable user, distributing the first version to an alternate user;

identifying corrections and changes to the first version via natural language analysis;
receiving a second, and revised, version of the current social media post from the second user;
detecting that the third user did not receive the second version; and
distributing the second version of the current social media post, which second version includes the corrections and changes, to the third user;
verifying that the second user and the third user have the second version of the current social media post;
identifying a final version of the current social media post; and
distributing the final version of the current social media post; and
blocking notification of the current social media post responsive to an indication that a user will not respond to the current social media post.

2. The system of claim 1, wherein the user behavior in the social media network in the database comprises recipients to whom a corresponding user has previously sent a social media post.

3. The system of claim 2, wherein the user behavior in the social media network in the database further comprises:
an order in which the recipients were sent a previous social media post; and
a time between receipt of the previous social media post and a reading of the previous social media post.

4. The system of claim 1, wherein the server identifies a new version of the current social media post based on its inclusion in at least one of a reply and a forward from the second user.

5. The system of claim 1, the server to dictate distribution of a version of the current social media post by recommending to whom that version of the current social media post should be communicated based on the matching user behavior.

6. The system of claim 1, the server further to:
identify a next step for the current social media post in the model workflow; and
perform the identified next step in the workflow without user intervention.

7. The system of claim 6, the server further to:
identify a timeout window for the next step in the model workflow, wherein the timeout window is a minimum amount of time provided to the users before the system automatically performs the identified next step; and
verify the timeout window has expired prior to performing the identified next step in the workflow without user intervention.

8. The system of claim 6, the server further to provide a notice to the first user of the next step for the current social media post in the model workflow.

9. The system of claim 6, wherein the next step for the current social media post in the model workflow comprises posting the current social media post to a public forum.

10. The system of claim 6, wherein the next step is requesting publication approval from the second user.

11. The system of claim 6, the server to implement a timeout before performing the identified next step in the workflow without user intervention.

12. The system of claim 6, the server to accept input for performing the next step, the input to be performed by any user among a group of users.

13. The system of claim 12, wherein the workflow distinguishes a most important user from a group of users.

14. The system of claim 6, wherein selecting a model workflow comprises selecting a model workflow with a highest match, wherein the highest match is above a predetermined threshold.

15. The system of claim 1, the server further to:
identify a notification to the first user concerning a post posted to a feed; and
determine a workflow based on the content of the post posted to the feed and the first user's behavior in the database.

16. The system of claim 15, the server further to:
monitor responses to the post posted to the feed;
continue blocking notifications until the workflow indicates user interest in the accumulated responses; and
allow a notification to the first user based on the workflow and the accumulated responses.

17. The system of claim 15, the server further to extract a plurality of workflows from a dataset of post interactions by a plurality of users.

18. A system for generating of posts, the system comprising:
a server; and
a network connection for the server;
the server to:
maintain a database of users and corresponding user behavior in a social media network when generating a social media post on a specific topic to be published in the social media network;
match a first user generating a current social media post and a topic of the current social media post to the user behavior in the database by:
matching the topic of the current social media post with a topic of historic social media posts; and
identifying user behavior of the historic social media posts;
identify multiple model workflows for the current social media post, wherein a model workflow:
comprises instruction code to execute actions associated with the current social media post;
is based on workflows for social media posts with characteristics similar to the current social media post, and
identifies a second user and a third user to whom the current social media post is to be sent for review;
compare characteristics for each model workflow with characteristics of the current social media post;
express, for each model workflow, a match between the characteristics of the current social media post and each multiple model workflow as a match percentage;
identify a frequency of use for each model workflow;
select a model workflow for the current social media post based on the match and frequency of use, wherein a first model workflow with a higher frequency of use is selected over a second model workflow with a higher match percentage;
identify, based on a selected model workflow, the second user and the third user as initial recipients of the current social media post;
distribute a first version of the current social media post to the second user and the third user for review;
access a calendar system for the second user and the third user to determine an availability of the second user and the third user;
identify that the second user or the third user is unavailable based on a determined availability from the calendar system; and responsive to identifying an unavailable user, distribute the first version to an alternate user;

identify corrections and changes to the first version via natural language analysis;

receive a second, and revised, version of the post from the second user;

detect that the third user did not receive the second version; and distribute the second version of the post, which second version includes the corrections and changes, to the third user;

verify that the second user and the third user have the second version of the current post;

visually indicate, for each version of the current post, whether the version is an obsolete version, a newest version, or a final version;

identify a final version of the post;

distinguish, via a version number, a revision by an author and a revision by a non-author by:

incrementing a ones place digit in the version number to indicate the revision by the author; and incrementing a number to a right of a decimal in the version number to indicate the revision by the non-author; and responsive to the second user and the third user replying to the current post, distribute the final version of the current post; and block notification of the current post responsive to an indication that a user will not respond to the current post.

19. The system of claim 1, wherein identifying the final version of the post is based on receiving feedback from the second user and the third user and on previous workflows on a similar topic.

20. The system of claim 1, wherein the characteristics by which similarity is determined comprise a time of the posts and an activity associated with the post on the author's schedule.

* * * * *